United States Patent Office 3,461,309
Patented Aug. 12, 1969

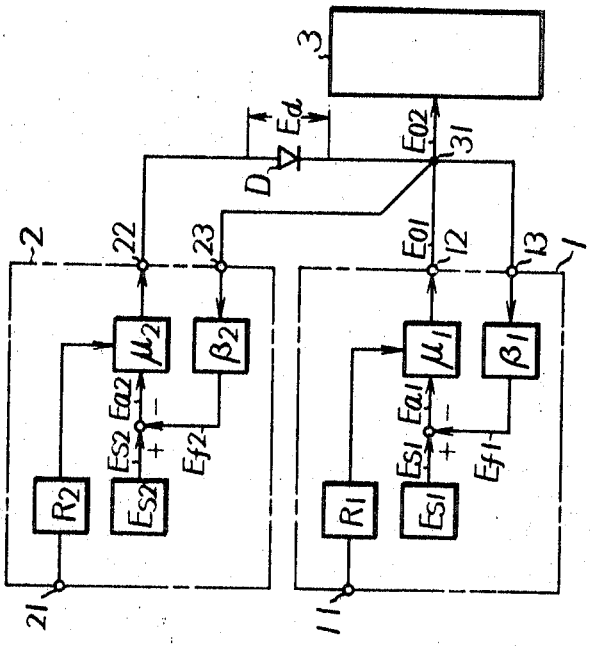
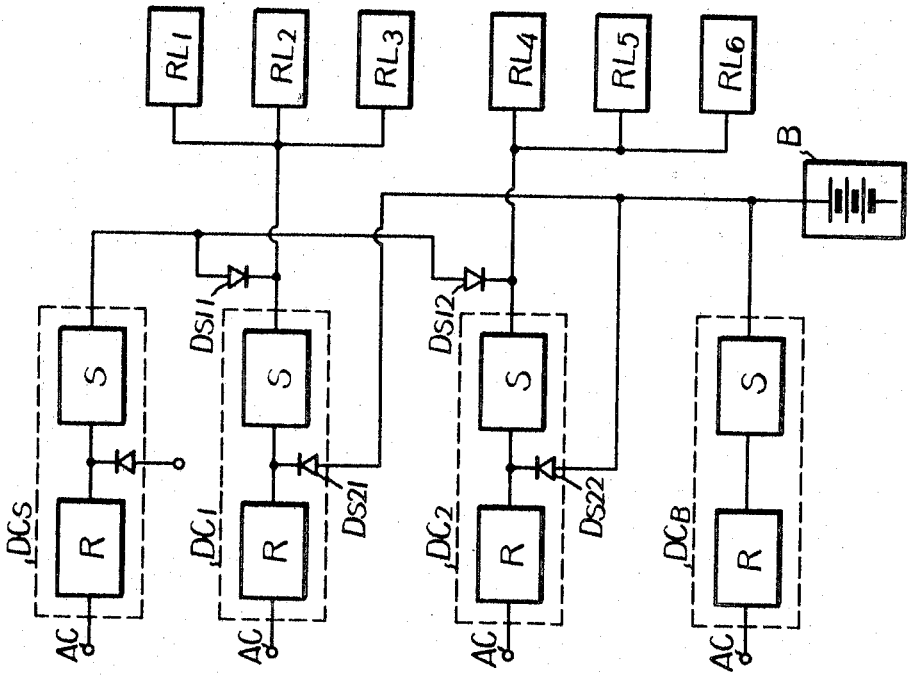

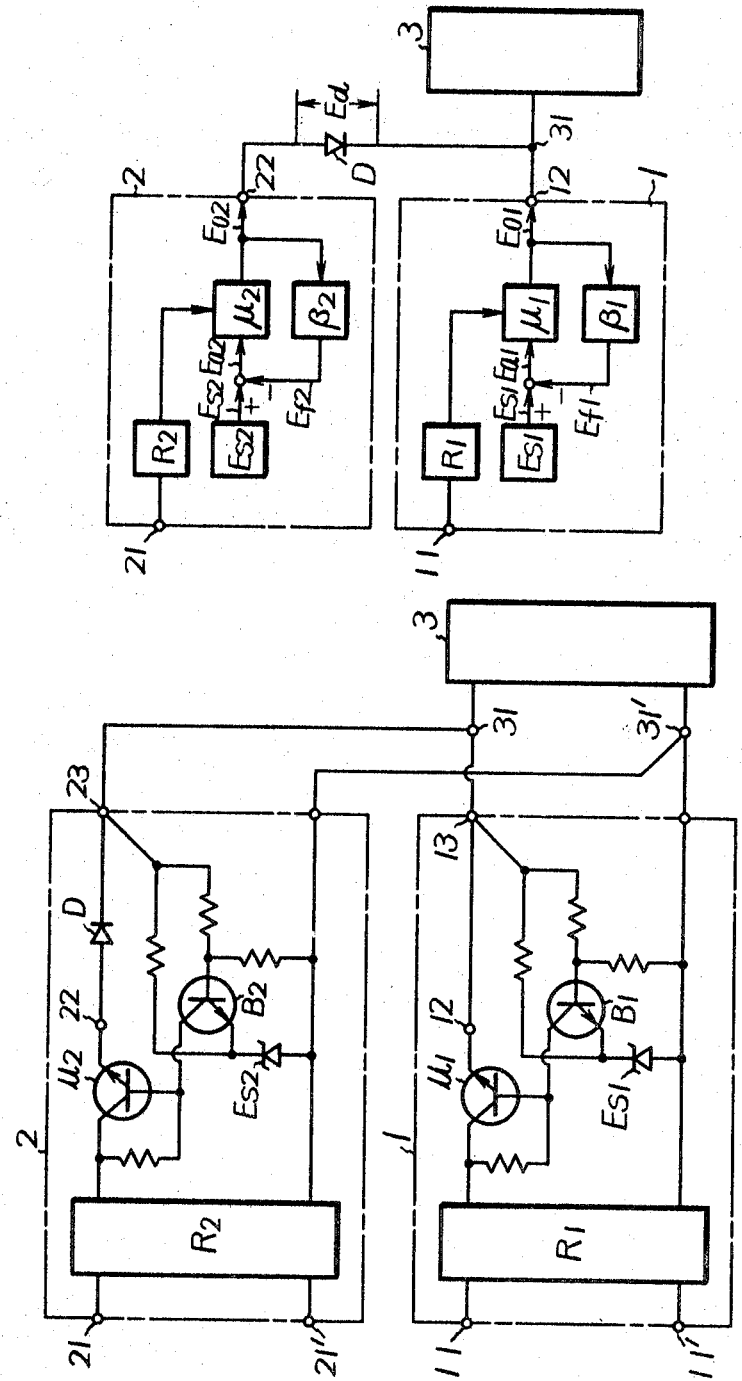

3,461,309
DC POWER SUPPLY APPARATUS FOR SUPPLYING A CONSTANT VOLTAGE TO A LOAD
Takashi Yamanaka, Tadashi Kamino, and Hiroshi Ikeda, Tokyo, Japan, assignors to Kabushikikaisha Yokogawa Denki Seisakusho (Yokogawa Electric Works Ltd.), Tokyo, Japan, a corporation of Japan
Filed Oct. 17, 1966, Ser. No. 587,322
Claims priority, application Japan, Oct. 18, 1965, 40/63,861; Jan. 28, 1966, 41/4,960
Int. Cl. H02j 9/06
U.S. Cl. 307—66                                   3 Claims

ABSTRACT OF THE DISCLOSURE

A DC power supply device for supplying a constant voltage to a load having a rectifier circuit for rectifying AC commercial power and producing a DC output including a controlling circuit including a reference voltage source and a feedback circuit for producing substantially constant DC voltage, and a battery for producing an output voltage lower than that of said rectifier circuit when the AC commercial power source is interrupted.

---

This invention relates to a DC power source device, and more particularly to an improved DC power source device which is highly reliable and well suited for simultaneous power supply to various apparatuses such as those employed in, for example, automatic control systems.

The automatic control systems usually employ a number of apparatuses requiring DC power for the operation thereof. For supplying power to such apparatuses the use of a single DC power source is economical. However, a power failure causes all the apparatus to stop and thus, the DC power source used for this purpose must be highly reliable.

The present invention resides in the provision of a reliable DC power source device which is designed such that upon the occurrence of interruption of service stabilized power is automatically supplied from a battery power source to a rectifier for rectifying and smoothing. Also, upon trouble in the rectifier an auxiliary or reserve rectifier is automatically switched on.

One object of this invention is to provide a DC power source device in which a battery source is switched on in the event of interruption of service and variations in the output voltage due to discharge of the battery are compensated to ensure constant voltage supply to loads at all times.

Another object of this invention is to provide a DC power source device which has an auxiliary or reserve rectifying power source that is switched on in the event of, trouble, and variations in the output voltage due to voltage drop across a diode switch are compensated to maintain constant voltage.

Other objects, features and advantages of this invention will become apparent from the following description taken in conjunction with the accompanying drawings, in which:

FIGURE 1 illustrates in block one example of a DC power source device produced according to this invention;

FIGURE 2 illustrates in block a rectifying power source employed in the DC power source device of this invention;

FIGURE 3 is a circuit diagram embodying the construction of the rectifying power source shown in FIGURE 2; and FIGURE 4 illustrates in block a rectifying power source heretofore employed.

In FIGURE 1 reference characters $DC_1$ and $DC_2$ indicate rectifying power sources each comprising a rectifier circuit R and a voltage stabilizer or regulator circuit S and converting the output of a commercial power source AC into DC output of a constant voltage for application to loads. Reference characters $RL_1$ to $RL_6$ designate various loads supplied with the outputs from the aforementioned rectifying power sources. Reference character $DC_S$ identifies an auxiliary rectifying power source constructed in the same manner as the rectifying power sources. Reference character B indicates a battery power source provided for use in the case of stoppage of the commercial power supply and $DC_B$ a rectifying power source for charging the battery power source B. The output terminals of the rectifying power source $DC_1$ is connected to the loads $RL_1$ to $RL_3$, while the output terminal of the rectifying power source $DC_2$ is connected to the loads $RL_4$ to $RL_6$. The output terminal of the auxiliary DC power source $DC_S$ is connected to the output terminals of the rectifying power sources $DC_1$ and $DC_2$ respectively through diode switches $D_{S11}$ and $D_{S12}$. The output terminal of the rectifying power source $DC_B$ for charging the battery power source B is connected to the output terminal thereof, while the output terminal of the battery B is connected through the diode switches $D_{S21}$ and $D_{S22}$ respectively to the connection points between the rectifier circuits R and the voltage stabilizing circuits S of the rectifying power sources $DC_1$ and $DC_2$.

A description will hereinafter be given in connection with the operation of the present invention device constructed as described in the foregoing. While the rectifying power sources $DC_1$ and $DC_2$ are in normal operation their outputs are applied to the loads $RL_1$ to $RL_3$ and $RL_4$ to $RL_6$ to actuate them. In this case, even if the value of the output voltage of the auxiliary rectifying power source $DC_S$ has been selected to be the same as that of the output voltages of the other rectifying power sources $DC_1$ and $DC_2$, the auxiliary rectifying power source $DC_S$ is held in the cut-off condition due to voltage drop of the diode switches $D_{S11}$ and $D_{S12}$, and hence the output of the rectifying power source $DC_S$ is not applied to the loads.

In such a rectifying power source device as has been described above, upon the occurrence of stoppage of the commercial power supply the supply of the DC output from the rectifying power sources is interrupted, but instead the battery power source B supplies DC power in the following manner. That is, upon the occurrence of the power stoppage the output voltage of the rectifier circuit of each rectifying power source rapidly lowers to zero. This leads to conduction of the switching diodes $D_{S21}$ and $D_{S22}$, which are normally held in the reverse biased condition, and interrupted and, as a result, the output of the battery power source B charged by the rectifying power source $DC_B$ is applied to each load through the stabilizing circuit of each rectifying power source. Since the output voltage of the battery power source B is subjected to great variations at the beginning of charging and at the end of discharging thereof, the voltage variations are absorbed by the stabilizing circuit of each rectifying power source so as to ensure constant voltage supply to the loads at all times. This makes it possible to supply the loads with stable voltage excluding the variations in the output voltage resulting from discharging of the battery power source.

Where the rectifying power source, for example, $DC_1$ gets out of order and its output voltage becomes lower than that of the auxiliary rectifying power source $DC_S$, the diode switch $D_{S11}$ becomes biased in the forward direction to be conductive and the output of the auxiliary rectifying power source $DC_S$ is automatically connected to the loads $RL_1$ to $RL_3$ and fed thereto, instead of the output from the rectifying power source $DC_1$. In this case, the use of a conventional type of rectifying power source in the DC power source device is attended by a disadvantage such that the output voltage varies with the voltage drop of the diode switch, since the output current is fed to the loads through the diode switch.

The DC power source device of this invention employs rectifying power sources which compensates for the voltage variations due to diode switch and produce no variations in the output voltage when the auxiliary rectifying power source is incorporated in the circuit.

Referring now to FIGURE 4, the operation of the present invention device will hereinbelow be described in detail.

In FIGURE 4 there is illustrated in block one example of the conventional rectifying power source of the type mentioned above. Reference numeral 1 indicates a rectifying power source of constant-voltage type and 11 an input power source terminal. Reference character $R_1$ designates a rectifying and smoothing circuit which is used in the case of AC input power and may be left out in the case of DC input power. Reference character $\mu_1$ identifies a voltage controller circuit for producing a contant-voltage output, $\beta_1$ a feedback circuit for feeding back the output of the voltage controller circuit $\mu_1$, and $E_{S1}$ a reference constant-voltage source such as a Zener diode. The reference voltage $E_{S1}$ and the feedback voltage $E_{f1}$ of the feedback circuit $\beta_1$ are differentially fed to the input side of the voltage controller circuit $\mu_1$. In this manner, the input power is automatically subjected to voltage control, producing a constant-voltage output $E_{o1}$ at the output 12. This rectifying power source may be in the form of a circuit such as depicted in FIGURE 2. Reference numeral 2 designates an auxiliary rectifying power source of constant-voltage type, which is constructed in the same manner as the aforementioned rectifying power source 1. The auxiliary rectifying power source comprises an input power source terminal 21, a rectifying and smoothing circuit $R_2$, a voltage controller circuit $\mu_2$, a feedback circuit $\beta_2$, a reference constant-voltage source $E_{S2}$ and an output terminal 22. Reference numeral 3 indicates a load circuit having an input terminal 31 connected to the output terminal 12 of the power source 1. Reference character designates a diode switch which is connected between the output terminal 22 of the auxiliary power source 2 and the input terminal 31 of the load circuit 3.

In this conventional device the output voltages of the power source 1 and the auxiliary rectifying power source 2 are normally maintained at a predetermined value such, for example, as 24 v. Under such circumstances, the output voltage $E_{o2}$ of the auxiliary power source 2 is inhibited by the energy-gap voltage $E_d$ (about 0.5 v.) of the diode D and is not applied to the load circuit 3. When the rectifying power source 1 gets out of order to lower its output voltage $E_{o1}$, the output voltage $E_{o2}$ of the auxiliary rectifying power source 2 is fed through the diode switch D to the load circuit 3 after being subjected to voltage drop corresponding to the energy-gap voltage of the diode D. Namely, in the conventional device when the auxiliary rectifying power source 2 is switched on, the voltage fed to the load circuit 3 varies with the energy-gap voltage (about 0.5 v.) of the diode switch D. Where a predetermined value of the voltage supplied is 24 v., this is a great variation accounting for about 2 percent of the voltage. Further, in order to apply the predetermined voltage (24 v.) to the load circuit 3, the output voltage $E_{o2}$ of the auxiliary rectifying power source 2 must be selected high (approximately 24.5 v.) enough to compensate for the voltage drop (about 0.5 v.) due to the diode D. However, with an output of the auxiliary rectifying power source 2 being higher than that of the rectifying power source 1, it is feared that during normal operation of the rectifying power source 1 the output of the auxiliary rectifying power source 2 is applied to the load circuit 3 and the power source 1 by temperature variations or the like to cause current to rush into the power source 1 of low internal impedance. Further, the regulation characteristic becomes deteriorated due to dynamic resistance of the diode D at the time of the back-up.

FIGURE 2 illustrates in block one example of a rectifying power source used in the device of this invention. The device shown in the figure is different from that depicted in FIGURE 4 in that the input terminal of the feedback circuit $\beta_2$ is connected to the output terminal of the diode D, namely to the terminal 31 of the load 3. The feedback circuit $\beta_2$ is adjusted to produce a predetermined voltage (24 v.) at the terminal 22 of the auxiliary rectifying power source 2.

With such an arrangement, during normal operation of the power source 1 the load terminal 31 and the terminal 22 of the auxiliary rectifying power source 2 connected through the diode D are of the same value at the predetermined voltage, so that the diode D is held in the off state so as to feed no voltage to the load circuit 3 from the auxiliary rectifying power source 2. Accordingly, the constant-voltage loop of the auxiliary rectifying power source 2 remains open at the diode D. It appears that, with such an arrangement, the normal operation of the rectifying power source 1 is likely to be adversely affected by the variations in the power source voltage. However, if the voltage of the terminal 22 greatly exceeds the predetermined value (24 v.) to render the diode D conductive, the control loop is immediately established to set back the voltage of the terminal 22 to the predetermined voltage, and hence the load circuit 3 and the rectifying power source 1 are not adversely affected. In the case where the voltage of the terminal 22 becomes lower than the predetermined value, the auxiliary rectifying power source 2 is not in actual use, so that no influence is exerted upon the load circuit 3 and the rectifying power source 1. Then, when the output voltage $E_{o1}$ of the rectifying power source 1 lowers due to some cause, the diode D becomes conductive to form the constant-voltage control loop of the auxiliary rectifying power source 2 and its output $E_{o2}$ is made to be a constant voltage (24 v.), thereafter being applied to the load circuit 3. The output voltage $E_{o2}$ is given by the following equation.

$$E_{o2} = \frac{2}{1+\mu_2\beta_2} E_{S2} - \frac{1}{1+\mu_2\beta_2} E_d \qquad (1)$$

where the loop gain $\mu_2\beta_2$ of the control loop is fully greater than 1. Therefore, the Equation 1 becomes as follows:

$$E_{o2} = \frac{1}{\beta_2} E_{S2} - \frac{1}{\mu_2\beta_2} E_d \qquad (2)$$

That is, the variations in the power source voltage due to the energy-gap voltage of the diode D becomes to be $$\frac{1}{\mu_2\beta_2}$$

of the loop gain and can be made sufficiently small. In the case where the loop gain $\mu_2\beta_2$ is 10, the variation in the power source voltage is 0.05 v. and its regulation accounts for about 0.2 percent of the predetermined value of 24 v. When $\mu_2\beta_2=100$, the variation is 0.005 v. and its regulation accounts for approximately 0.02 percent of the predetermined voltage. The influence by such small variations can be neglected. In this manner, the influence by the energy-gap voltage $E_d$ of the diode switch can be removed and stable backing-up can be accomplished without producing the variations in the power source voltage.

In FIGURE 3 there is illustrated an electrical connection diagram for use with the rectifying power source depicted in FIGURE 2, similar components being identified by the similar reference numerals. In FIGURE 2 the diode switch D is provided on the outside of the auxiliary rectifying power source 2, but the same results can be obtained by the provision of the diode switch D on the inside of the auxiliary rectifying power source 2, as illustrated in the example of FIGURE 3.

As is apparent from the foregoing, upon the occurrence of stoppage of the commercial power supply a predetermined DC power can always be supplied to loads, and when the rectifying power source gets out of order power can be supplied stably from the auxiliary rectifying power source without being adversely affected by the diode switch. This ensures the production of a highly reliable and stable DC power source device.

It will be apparent that many modifications and variations may be effected without departing from the scope of the novel concepts of this invention.

What we claim is:

1. A DC power supply for supplying a constant voltage to a load upon occurrence of interruption of an AC commercial power source comprising a rectifier circuit for rectifying the output of an AC commercial power source to produce a DC output, a controlling circuit connected to the output side of said rectifier circuit and having a standard voltage source and a feedback circuit, said controlling circuit comparing the output of the rectifier circuit with that of said standard voltage source to control its gain to produce a substantially constant DC output voltage, a diode switch connected to the output side of said rectifier circuit and the input side of said controlling circuit for producing an output voltage lower than that of said rectifier circuit when said AC commercial power source is interrupted, whereby said DC power supply apparatus supplies substantially constant DC voltage to said load and a battery connected to said diode switch.

2. A DC power supply for supplying a constant DC voltage to a load comprising a main rectifying circuit consisting of a rectifier circuit for rectifying the output of an AC commercial power source to produce a DC output and a main controlling circuit connected to the output side of said main rectifier circuit and having a standard voltage source and a feedback circuit, said main controlling circuit comparing the output thereof with that of said standard voltage source to control its gain to produce a substantially constant DC output voltage, a second rectifying circuit consisting of a second rectifier circuit for rectifying the output of the AC commercial power source to produce a DC output and a second controlling circuit connected to the output side of said second rectifier circuit and having a standard voltage source and a second feedback circuit, a diode switch connected in said second feedback circuit, said main and second rectifying circuits connected to said load in parallel relationship, whereby said main rectifying circuit supplies its output voltage to said load under normal operation and said second rectifying circuit supplies its output voltage to said load due to operation of said diode switch when said main rectifying circuit is out of order.

3. A DC power supply apparatus as claimed in claim 2, wherein a battery is connected to the respective connecting points of the outputs of each of said rectifier circuits and the input sides of each of said controlling circuit.

References Cited

UNITED STATES PATENTS 3,240,949   3/1966   Balkow et al.    307—64 X

ROBERT K. SCHAEFER, Primary Examiner

H. J. HOHAUSER, Assistant Examiner